(12) United States Patent
Koefod et al.

(10) Patent No.: US 7,147,797 B2
(45) Date of Patent: *Dec. 12, 2006

(54) DEICER AND PRE-WETTING AGENT

(75) Inventors: Robert Scott Koefod, Maple Grove, MN (US); Richard Hunt Rose, III, Glendale, CA (US)

(73) Assignee: Sears Petroleum & Tranport Corporation, Rome, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 10/923,370

(22) Filed: Aug. 20, 2004

(65) Prior Publication Data

US 2005/0017215 A1 Jan. 27, 2005

Related U.S. Application Data

(63) Continuation of application No. 10/211,988, filed on Aug. 1, 2002, now Pat. No. 6,800,217, which is a continuation-in-part of application No. 10/143,685, filed on May 9, 2002, now abandoned, which is a continuation of application No. 09/794,256, filed on Feb. 27, 2001, now Pat. No. 6,398,979.

(60) Provisional application No. 60/185,482, filed on Feb. 28, 2000.

(51) Int. Cl.
C09K 3/18 (2006.01)

(52) U.S. Cl. .......................... 252/70; 106/13
(58) Field of Classification Search ................ 252/70; 106/13
See application file for complete search history.

(56) References Cited

U.S. PATENT DOCUMENTS

| | | | |
|---|---|---|---|
| 1,776,181 A | 9/1930 | Collins | |
| 3,796,608 A * | 3/1974 | Pearlman | 428/450 |
| 4,664,832 A | 5/1987 | Sandvig et al. | |
| 4,668,416 A | 5/1987 | Neal | |
| 4,676,918 A * | 6/1987 | Toth et al. | 252/70 |
| 4,746,449 A | 5/1988 | Peel | |
| 4,824,588 A | 4/1989 | Lin | |
| 5,135,674 A | 8/1992 | Kuhajek et al. | |
| 5,211,868 A * | 5/1993 | Ireland et al. | 252/70 |
| 5,531,931 A * | 7/1996 | Koefod | 252/387 |
| 5,635,101 A * | 6/1997 | Janke et al. | 252/70 |
| 5,639,319 A * | 6/1997 | Daly | 152/450 |
| 5,709,812 A | 1/1998 | Janke et al. | |
| 5,709,813 A | 1/1998 | Janke et al. | |
| 5,772,912 A | 6/1998 | Lockyer et al. | |
| 5,817,252 A | 10/1998 | Hu et al. | |
| 5,849,356 A | 12/1998 | Gambino et al. | |
| 5,922,240 A * | 7/1999 | Johnson et al. | 252/70 |
| 5,932,135 A | 8/1999 | Janke et al. | |
| 5,965,058 A * | 10/1999 | Janke et al. | 252/70 |
| 5,980,774 A | 11/1999 | Sapienza | |
| 6,080,330 A * | 6/2000 | Bloomer | 252/70 |
| 6,129,857 A | 10/2000 | Sapienza | |
| 6,149,834 A * | 11/2000 | Gall et al. | 252/70 |
| 6,315,919 B1 | 11/2001 | Sapienza | |
| 6,398,979 B1 * | 6/2002 | Koefod et al. | 252/70 |
| 6,468,442 B1 | 10/2002 | Bytnar | |
| 6,506,318 B1 | 1/2003 | Sapienza et al. | |
| 6,605,232 B1 | 8/2003 | Montgomery et al. | |
| 6,800,217 B1 * | 10/2004 | Koefod et al. | 252/70 |
| 2002/0063236 A1 | 5/2002 | Sapienza | |
| 2003/0015685 A1 | 1/2003 | Sapienza et al. | |
| 2003/0136940 A1 | 7/2003 | Sapienza et al. | |
| 2003/0168625 A1 | 9/2003 | Sapienza et al. | |
| 2003/0201421 A1 | 10/2003 | Sapienza | |
| 2003/0205694 A1 | 11/2003 | Sapienza et al. | |
| 2004/0079919 A1 | 4/2004 | Sapienza et al. | |

FOREIGN PATENT DOCUMENTS

| | | | |
|---|---|---|---|
| CA | 2135662 A * | 5/1996 | |
| GB | 796633 | 6/1958 | |
| SU | 1664808 A * | 7/1991 | |
| WO | WO87/03293 A1 * | 6/1987 | |
| WO | WO99/37732 A1 * | 7/1999 | |
| WO | WO 01/07532 A1 | 2/2001 | |
| WO | WO01/64811 A2 * | 9/2001 | |
| WO | WO02/26910 A1 * | 4/2002 | |

OTHER PUBLICATIONS

"Public Works:Winter Is Hell", Public Works; Jul. 1, 1997.*
"Corn Steep Liquor," Hansa Melasse Handelsgesellschaft m.b.H., http://www.hamburg-net.com/hm/english/v_com.html, 1 page (Date Printed Jun. 8, 1999).
"Critical Data Tables," Corn Refiners Association, Inc., 11 pages (Date Unknown).
"Density, Refractive Index, Freezing Point Depression, and Viscosity of Aqueous Solutions," *CRC Handbook of Chemistry and Physics*, 78th Edition, pp. 8-56-8-74 (1997-1998), no month.
"Further Characterization of De-icing/Anti-icing Formulation," ORTECH Corporation, pp. 1-9 (Dec. 18, 1998).
"Ice Ban: A Kinder, Gentler De-icer," *The Carbohydrate Economy*, pp. 18-19 (Fall 1998), no month.

(Continued)

*Primary Examiner*—Anthony J. Green
(74) *Attorney, Agent, or Firm*—Wall Marjama & Billinski LLP

(57) ABSTRACT

A liquid deicer composition suitable for use as a deicer or as a pre-coat for solid deicers is disclosed. The composition typically includes molasses solids, magnesium chloride, and a corrosion inhibitor. In one implementation the liquid deicer composition includes molasses solids; magnesium chloride, and a corrosion inhibitor.

5 Claims, No Drawings

OTHER PUBLICATIONS

"Lowering of Freezing Point for Aqueous Solutions," *CRC Handbook of Chemistry and Physics*, 36th Edition, pp. 2117-2118 (1954-1955), no month.

"M-50 Road Deicer Product Information," distributed by Mountain Products & Equipment, 6 pages (Date Unknown).

"Manual of Practice for an Effective Anti-icing Program: A Guide for Highway Winter Maintenance Personnel," U.S. Department of Transportation Federal Highway Administration, 8 pages (Jun. 1996).

"Manual of Practice for an Effective Anti-icing Program: A Guide for Highway Winter Maintenance Personnel," U.S. Department of Transportation Federal Highway Administration, http://www.fhwa.dot.gov/reports/mopeap/mop0296a.htm, pp. 1-67 (Date Printed Oct. 28, 2003).

"New sheriff Dion wastes no time getting in saddle," *Portland (ME) Press Herald*, 1 page (Jan. 9, 1999).

"Technical Evaluation Report Preliminary Evaluation Findings for Ice Ban™," prepared by the Highway Innovative Technology Evaluation Center, pp. i-vi, 1-13 (Apr. 1998).

"Technical Evaluation Report Summary of Evaluation Findings for the Testing of Ice Ban®," prepared by the Highway Innovative Technology Evaluation Center, pp. i-xvi, 1-91 (Sep. 1999).

"Testing & Technical Information Presented to: Cargill, Inc.," Ice Ban America, Inc., 128 pages (Date Unknown).

Baker, B., "Composition, Properties and Uses of Malasses and Related Products," United Molasses Trading Co., Ltd., 44 pages (Date Unknown).

Beyerlein, T., "Ice Ban is roads' new low-salt diet," *Dayton Daily News*, 1 page (Date Unknown).

Hand, J., "A bit of MAGic on the Roads CNY public works crews gives new de-icer good reviews," *Syracuse Herald Journal*, 2 pages (Dec. 31, 2000).

Hull, S. et al., "Composition of Corn Steep Water During Steeping," *J. Agric. Food Chem.*, vol. 44, pp. 1857-1863 (1996), no month.

Kilpatrick, K., "Chemical is Coventry's new weapon against ice," *The Chronicle (Willimantic, CT)*, 1 page (Jan. 12, 1999).

Kuzel, F., "Highway De-icer from Ethanol By-products Could Boost Dry-Mill Ethanol Industry," *EverGreen*, vol. 2, No. 4, pp. 1, 3 (Aug./Sep. 1997).

Lorant, R., "Road goo being tested as de-icer in N.E. Thick, brown stuff costs less than salt and tastes sort of like molasses," *Bristol Press*, 1 page (Jan. 17, 1998).

Montville, R., "City spreads beer byproduct on icy roads," *News Tribune*, 1 page (Jan. 15, 1999).

Murray, D. et al., "Low-D.E. Corn Starch Hydrolysates: Multifunctional carbohydrates aid in food formulation," *Food Technology*, vol. 27, No. 3, pp. 32-40 (1973), no month.

Niederpruem, K, "Salt Crystals are at crossroads," *Indianpolis Star*, 3 pages (Jan. 15, 1999).

Pancoast and Junk, Handbook of Sugars, AVI Press, pp. 224 (Date Unknown).

Savant, N. et al., "Chemical Nature of Spent Wash (Distillery Waste)," *Journal of Maharestra Agricultural Universities*, vol. 7, No. 1, pp. 1-4 (1982), no month.

Sebree, B. et al., "Brewers Condensed Solubles. I. Composition and Physical Properties," *Cereal Chemistry*, vol. 60, No. 2, pp. 147-151 (1983), no month.

Upton, B., "Slip-Sliding Away," *Southbridge Evening News*, 1 page (Feb. 16, 1998).

Common Ice Melter Ingredients, 3 pgs., http://www.vigoro.on.ca/ice/ingred.html, Aug. 30, 1998.

Manual of Practice for an Effective Anti-Icing Program-A Guide for Highway Winter Maintenance Personnel, Prepared for the Federal Highway Administration by US Army Cold Regions Research and Engineering Laboratory Corps of Engineers, Hanover, New Hampshire, Draft Feb. 22, 1996, pp. i-64.

1 page advertisement titled "Fusion Liquid De-Icer" (Publication date unknown).

* cited by examiner

DEICER AND PRE-WETTING AGENT

PRIORITY

This application is a continuation of U.S. application Ser. No. 10/211,988 filed on Aug. 1, 2002, now U.S. Pat. No. 6,800,217 which is a continuation-in-part of U.S. application Ser. No. 10/143,685, file date May 9, 2002 abandoned, which is a continuation of U.S. application Ser. No. 09/794,256, filed Feb. 27, 2001, now U.S. Pat. No. 6,398,979, which claims the benefit of U.S. Provisional application Ser. No. 60/185,482, filed on Feb. 28, 2000, which applications are incorporated herein by reference.

FIELD OF THE INVENTION

The present invention relates to improved deicer compositions. More particularly, the invention is directed to molasses containing deicers which have improved corrosion resistance, and are suitable for use directly as deicers or as pre-wetting agents for solid deicers.

BACKGROUND

Solid deicers, such as rock salt (sodium chloride) and abrasives, such as sand, are commonly applied to roads and other surfaces during winter months. These solid deicers and abrasives are often pre-wetted before being stored or applied. Pre-wetting involves addition of a liquid to the solid deicer or abrasive in order to give it increased resistance to freezing, improved storage characteristics, flowability, and deicing performance. Brines of sodium chloride, calcium chloride, and magnesium chloride are often used for this purpose. Unfortunately, these chloride based materials have a tendency to accelerate corrosion of automobiles, maintenance equipment, and infrastructure. Therefore, a need exists for an improved deicer composition that is less corrosive, including a deicer composition that can be used alone or can be added to solid deicers as a pre-wetting agent.

SUMMARY OF THE INVENTION

The present invention is directed to a liquid deicer composition suitable for use as a deicer or as a pre-coat for solid deicers. The composition typically includes molasses solids, magnesium chloride, and a corrosion inhibitor. In one implementation the liquid deicer composition includes from 1.0 to 70 percent molasses solids; from 0.1 to 40 percent magnesium chloride; and from 0 to 30 percent of a corrosion inhibitor.

In specific embodiments the composition has less than 45 percent by weight molasses solids. Suitable molasses includes cane molasses, citrus molasses, wood molasses, grain molasses, and combinations thereof. The magnesium chloride may be derived from liquid bittern, including liquid bittern containing 30 percent magnesium chloride. In some implementations the bittern contains less than 20 percent magnesium chloride by weight. Suitable corrosion inhibitors include phosphate salts, such as orthophosphates, polyphosphates, pyrophosphates, and organic phosphonates. Also, triethanolamine can be used as a corrosion inhibitor in accordance with the invention.

In addition to these ingredients, the composition can also include a solid deicer, such as sodium chloride, calcium chloride, urea, acetate salts, and combinations thereof. Suitable solid deicers include sodium chloride and magnesium chloride mixtures. The liquid composition can be applied by spray to the solid deicer as a pre-treatment to improve the performance and application of the solid deicer. In most implementations the liquid composition is applied to the solid deicer at a mixing facility. Alternatively, the liquid composition can be applied to the solid deicer at distributed locations, such as directly in a deicer dispensing truck. A useful composition containing a solid deicer includes 0.5 to 13 percent by weight magnesium chloride; 0.6 to 1.5 percent monosodium phosphate; 1.0 to 3.0 percent by weight molasses solids; and 82 to 96 percent by weight sodium chloride, all on a dry solids basis.

The above summary of the present invention is not intended to describe each discussed embodiment of the present invention. This is the purpose of the detailed description which follows.

DETAILED DESCRIPTION

The present invention is directed to a liquid deicer composition suitable for use as a deicer or as a pre-coat for solid deicers. The composition typically includes molasses solids, magnesium chloride, and a corrosion inhibitor. In one implementation the liquid deicer composition includes from 1.0 to 70 percent molasses solids; from 0.1 to 40 percent magnesium chloride; and from 0 to 30 percent of a corrosion inhibitor.

As used herein, the term "molasses solids" refers to the components of molasses that are not water, such as various carbohydrates (e.g. sugars) and proteins. Typical commercial grade molasses compositions used with the present invention are approximately 40 to 95 percent molasses solids, more typically approximately 70 to 85 percent solids. Specific suitable molasses compositions have about 80 percent solids. Suitable molasses includes cane molasses, citrus molasses, wood molasses, grain molasses, and combinations thereof.

The magnesium chloride may be derived, for example, from liquid bittern. As used herein, liquid bittern is a product derived from sea salt production, and is the liquid remaining after removal of sodium chloride from seawater. Liquid bittern normally contains water along with a high concentration of magnesium chloride and lower concentrations of other salts. In most implementations the liquid bittern contains from 20 to 35 percent magnesium chloride. However, in other implementations liquid bittern contains less than 20 percent magnesium chloride.

Suitable corrosion inhibitors include phosphate salts, such as orthophosphates, polyphosphates, pyrophosphates, and organic phosphonates. Also, triethanolamine can be use as a corrosion inhibitor in accordance with the invention. Diammonium phosphate and monosodium phosphate are two specific phosphate salts that can be used individually or together to provide corrosion inhibition. Calcium phosphates are also suitable for use with the invention.

In addition to these ingredients, the composition can also include a solid deicer, such as sodium chloride, magnesium chloride, calcium chloride, urea, acetate salts, and combinations thereof. In such implementations the solid deicer is normally present in a significantly greater quantity than the molasses solids or the corrosion inhibitor. Typically the amount of solid deicer is greater than twice the amount of molasses solids, and even more typically greater than ten times the amount of the molasses solids. The liquid composition may be applied by spray to the solid deicer as a pre-treatment to improve the performance and application of the solid deicer. A suitable composition containing a deicer includes one or more phosphate salts, molasses solids, magnesium chloride, and sodium chloride. Specific embodiments have at least 0.5 percent by weight phosphate salt, at least 0.5 percent by weight molasses solids, at least 2.0 percent by weight magnesium chloride, and at least 70 percent by weight sodium chloride. Example concentrations for the various components are 0.5 to 2.0 percent by weight of a phosphate salt, 0.5 to 2.0 percent by weight molasses solids, 2 to 6 percent by weight magnesium chloride, and 80 to 97 percent by weight sodium chloride. These percentages are all given as relative percentages to the other ingredients that are described. Additional ingredients (such as sand or water) can also be added to the composition, but do not change the relative percentages of these ingredients.

Suitable specific compositions that can be used as a deicer can include greater than 0.5 percent by weight magnesium chloride, greater than 1.0 percent by weight molasses solids, and greater than 80 percent by weight sodium chloride. For example, a composition can contain from 0.5 to 13 percent by weight magnesium chloride, from 1.0 to 3.0 percent by weight molasses solids, and from 85 to 96 percent by weight sodium chloride. Specific compositions contain from 0.5 to 1.5 percent by weight monosodium phosphate, while other compositions contain up to 2.0 percent by weight diammonium phosphate.

Other example compositions are 0.5 to 1.5 percent by weight monosodium phosphate; 1.5 to 2.5 percent by weight liquid bittern; 1.5 to 2.5 percent by weight cane molasses solids; and 90 to 96.5 percent by weight sodium chloride. The liquid bittern in this composition is typically from about 30 to 35 percent magnesium chloride. Thus, the composition contains from about 0.5 to 1.0 percent magnesium chloride. Another suitable composition comprises 0.5 to 1.5 percent by weight monosodium phosphate; 0.5 to 1.0 percent by weight diammonium phosphate; 1.5 to 2.5 percent by weight cane molasses solids; and 90 to 96.5 percent by weight sodium chloride. Yet another suitable composition comprises 0.5 to 2.0 percent by weight monosodium phosphate; 1.5 to 2.5 percent by weight cane molasses solids; 1.5 to 2.5 percent chloride salt (such as magnesium chloride or calcium chloride); and 90 to 96.5 percent by weight sodium chloride.

Yet another suitable composition is a mixture of 2.2% cane molasses, 2.2% liquid magnesium chloride (30% magnesium chloride), 7.0% magnesium chloride hexahydrate, 1.2% diammonium phosphate, 1.1% sodium gluconate (alternatively from about 0.10% to 5.0%), and the balance of the formula being sodium chloride. Also, magnesium may be substituted with other soluble magnesium salts such as magnesium sulfate or magnesium nitrate. In some implementations the compositions range from trace amounts of sodium gluconate up to nearly 100 percent sodium gluconate. More typically the amount of sodium gluconate is much lower than 100 percent, and closer to less than 10 percent, and even less than 5 percent. In some implementations the amount of sodium gluconate is less than 3 percent, and often from about 1 to 2 percent or 0.5 to 1.5 percent of the composition When added as a pre-wetting agent, the compositions of the invention typically depress the freezing point of solid deicers or abrasives to which they are applied, and inhibit corrosion. Thus, the compositions aid in reducing freezing and hardening of solid deicers into large pieces that are difficult to apply. To test this aspect of the present formulations, rock salt with approximately 2 percent moisture was stored at −4° F. for 24 hours and checked for flowability. Rock salt samples containing 4.3 percent by weight of a pre-wetting agent containing 50 percent cane molasses (which was approximately 80 percent molasses solids) and 50 percent liquid magnesium chloride remained flowable, while the rock salt without the pre-wetting agent was frozen solid.

In order to demonstrate the improved properties of compositions formulated in accordance with the present invention, liquid magnesium chloride derived from solar salt production (liquid bittern) was tested for corrosiveness when blended with varying levels of cane molasses. To test this corrosiveness, ½ inch flat steel washers meeting ASTM Specification F436, Type 1 were exposed to 3 percent by volume dilutions of different liquid formulations. Triplicate sets of washers were subjected to repeated cycles of 10 minutes immersion in the test solution followed by 50 minutes of air drying for a period 72 hours. The results of this test are shown below in Table 1:

TABLE 1

| Formulation | Corrosion Rate (MPY*) |
|---|---|
| 100% liquid bittern | 30 |
| 5% cane molasses, 95% liquid bittern | 17 |
| 50% cane molasses, 50% liquid bittern | 8 |

(*MPY = mils per year)

Table 1 demonstrates a significant decrease in the corrosiveness of the liquid deicer when molasses is added to the liquid. Even a relatively small dose of molasses can have a dramatic improvement in corrosion resistance, as demonstrated by the formulation containing just 5 percent molasses. An even greater improvement is demonstrated when equal portions of cane molasses and liquid bittern are combined, as demonstrated in the last formulation.

The synergistic effect of the molasses and liquid bittern with other corrosion inhibitors as a treatment for solid sodium chloride deicers was tested by using the liquid deicer composition as a pre-wetting agent on solid sodium chloride. The pre-wetting agent included 50 percent cane molasses and 50 percent liquid bittern (of which 30 percent was magnesium chloride). To test corrosiveness, ½ inch flat steel washers meeting ASTM Specification F436, Type 1 were exposed to 3 percent by weight dilutions of different solid formulations. Triplicate sets of washers were subjected to repeated cycles of 10 minutes immersion in the test solution followed by 50 minutes of air drying for a period 72 hours. The results of this test is shown below in Table 2:

TABLE 2

| Deicer Composition | Corrosion Rate (MPY) |
|---|---|
| 100% sodium chloride | 51 |
| 99.1% sodium chloride, 0.9% MSP | 30 |
| 95.7% sodium chloride, 4.3% pre-wetting agent | 42 |
| 94.8% sodium chloride, 4.3% pre-wetting agent, 0.9% MSP | 15 |

As demonstrated in Table 2, the composition with the greatest reduction in corrosion was the composition containing the pre-wetting agent and the mono sodium phosphate (MSP). Untreated sodium chloride demonstrated a corrosion rate of 51 mils per year, and treatment with only MSP achieved a reduction of corrosion to 30 MPY. Use of only the pre-wetting agent decreased corrosion to 42 MPY. However, treatment with the combination of MSP and the pre-wetting agent brought the corrosion rate down by 36 MPY to 15 MPY. Thus, in the example tested, a very significant complimentary effect was observed by combining the corrosion reducer with the molasses-containing pre-wetting agent. Although phosphates have been used as corrosion inhibitors for deicers, it is desirable to reduce the level of phosphate as much as possible to reduce cost as well as to reduce the amount of phosphate put into the environment.

Additional experimental data includes the following formulations and their relative corrosion protection:

| Formula | % Corrosion Protection |
|---|---|
| 100% salt | 0 |
| 1.2% DAP, 2.15% molasses, 2.15% liq MgCl2, 6.9% MgCl2.6H2O, 87.6% sodium chloride | 80.5% |
| 1.2% DAP, 2.15% molasses, 2.15% liq MgCl2, 6.9% MgCl2.6H2O, 0.25% sodium gluconate, 87.4% sodium chloride | 84.5% |
| 1.2% DAP, 2.15% molasses, 2.15% liq MgCl2, 6.9% MgCl2.6H2O, 0.5% sodium gluconate, 87.1% sodium chloride | 86.7% |
| 1.2% DAP, 2.15% molasses, 2.15% liq MgCl2, 6.9% MgCl2.6H2O, 0.75% sodium gluconate, 86.9% sodium chloride | 86.7% |
| 1.2% DAP, 2.15% molasses, 2.15% liq MgCl2, 6.9% MgCl2.6H2O, 1.15% sodium gluconate, 86.5% sodium chloride | 90.4% |

While the present invention has been described with reference to several particular implementations, those skilled in the art will recognize that many changes may be made hereto without departing from the spirit and scope of the present invention.

We Claim:

1. A deicer composition, the composition comprising on a water-free basis:
   from 1.0 to 70 percent by weight molasses solids;
   from 0.1 to 40 percent by weight magnesium chloride;
   from 0.5 to 30 percent by weight of a corrosion inhibitor; and
   up to 10 percent sodium gluconate;
   wherein the molasses is derived from cane molasses, citrus molasses, grain molasses, and combinations thereof.

2. The composition according to claim 1, wherein the magnesium chloride is derived from liquid bittern.

3. The composition of claim 1, wherein the corrosion inhibitor comprises a phosphate salt.

4. The composition of claim 1, wherein the corrosion inhibitor comprises triethanolamine.

5. The composition of claim 1, comprising from 0.1 to 10 percent sodium gluconate.

* * * * *